United States Patent
Ikeda et al.

[11] Patent Number: 5,229,858
[45] Date of Patent: Jul. 20, 1993

[54] NOISE FREE, LINE FORM IMAGE SENSOR

[75] Inventors: Chikaho Ikeda; Hiroshi Fujimagari, both of Kanagawa, Japan

[73] Assignee: Fuji Xerox Co., Ltd., Tokyo, Japan

[21] Appl. No.: 638,983

[22] Filed: Jan. 10, 1991

[30] Foreign Application Priority Data

Jan. 11, 1990 [JP] Japan .................................. 2-2588

[51] Int. Cl.$^5$ .......................... H04N 5/30; H04N 1/02
[52] U.S. Cl. ........................... 358/213.11; 358/213.29; 358/213.31; 250/208.1
[58] Field of Search ...................... 358/213.15, 213.23, 358/213.29, 213.31, 213.11, 483; 357/24 LR, 30; 250/208.1

[56] References Cited

U.S. PATENT DOCUMENTS

| | | | |
|---|---|---|---|
| 4,499,384 | 2/1985 | Segawa et al. | 358/213.29 |
| 4,556,800 | 12/1985 | Ohta et al. | 358/213 |
| 4,565,928 | 1/1986 | Yamamoto et al. | 358/213.29 |
| 4,604,527 | 8/1986 | Chenevas-Paule et al. | 358/213.29 |
| 4,714,836 | 12/1987 | Kitamura et al. | |
| 4,746,804 | 5/1988 | Kitamura et al. | |
| 5,026,980 | 6/1991 | Ondris | 250/208.1 |

FOREIGN PATENT DOCUMENTS 57-64968  4/1982  Japan .
58-62978  4/1983  Japan .
63-86973  4/1988  Japan .

Primary Examiner—James J. Groody
Assistant Examiner—Glenton B. Burgess
Attorney, Agent, or Firm—Finnegan, Henderson, Farabow, Garrett & Dunner

[57] ABSTRACT

An image sensor comprising a plurality of light-receiving elements, each of which consists of a pair of photodiodes connected in series-opposition. Since the voltages generated at these photodiodes when equal intensities of light is projected on them are equal to each other, no current leaks, thereby generating no noise.

4 Claims, 4 Drawing Sheets

NOISE FREE, LINE FORM IMAGE SENSOR

BACKGROUND OF THE INVENTION

The present invention relates to an image sensor to be used in an input section of apparatus such as facsimile machines. More particularly, it is directed to the improvement of the image sensor having a plurality of light-receiving elements arranged in line form with each light-receiving element with a photodiode and a blocking diode connected in series-opposition.

Conventionally proposed image sensors for use in apparatus such as facsimile machines to read images are arranged so that a photodiode and a blocking diode are connected in series-opposition to form a light-receiving element. A series of the light-receiving element are arranged in a line.

More specifically, as shown in FIGS. 6 and 7, the light-receiving element portion of the above-described image sensors has a metal electrode 2 which may be comprised of Cr, for example. The light-receiving element portion is further provided with a photoconductive layer 3 which may be made of a-Si:H (amorphous silicon hydride). A transparent electrode 4 made of, for example, ITO (indium-tin oxide), is also included in the light-receiving element portion, which further includes an insulating layer 5. The insulating layer 5 can be made of polyimide, for example, which is sequentially laminated and then patterned on a transparent substrate 1. Glass can be used for the transparent substrate 1, which is further provided to form a photodiode PD and a blocking diode BD. Lead lines 7a, 7b made of, for example, Cr are arranged through contact holes 6, 6 formed in the insulating layer 5. The photodiode PD side is provided with a light-receiving region A (shaded in FIG. 7) onto which light is irradiated, while the blocking diode side is shielded by the lead line 7b so that the light is not irradiated thereonto. A plurality (n) of such a light-receiving elements are arranged to form an array. The respective lead lines 7b on the blocking diode BD side are connected to a shift register SR as shown in FIG. 8, while the respective lead lines 7a on the photodiode PD side are grounded through a loading resistor R with an output terminal Tout arranged on the side of the photodiode.

The image sensor thus arranged reads electric charges in the following way.

The shift register SR scans each photodiode PD and sequentially applies a signal thereto. Each photodiode PD to which the signal has been applied stores electric charge. During one round of such scanning operation, light is irradiated onto each photodiode PD, discharging the electric charge in amounts commensurate with an amount of the irradiated light. Then, a reset signal (read pulse) is sequentially applied from the shift register SR, causing each photodiode to recharge the electric charge in amounts commensurate with the amount of light received, and a potential generated at the output terminal T out by the current flowing through the loading resistor R at this moment is read as a signal (see, e.g., Japanese Patent Unexamined Publication No. 62978/1983).

However, the above conventional image sensor is disadvantageous as follows.

The disadvantage will be described with reference to one bit of the image sensor shown in FIG. 9. When a read pulse is applied to the blocking diode BD for a pulse duration tr, a reset voltage V whose polarity arrangement is as shown in FIG. 9 is applied during the pulse duration tr. In contrast, when a read pulse is not applied, the condition is identical to being grounded. In other words, when a pulse is applied, an electric charge of Q=CP V is stored across a photodiode PD that is reverse-biased to the reset voltage V (where CP designates a capacitance of the photodiode PD). When the pulse is completed (the condition identical to being grounded), the electric charge Q (CP V) is divided into the CP and a CB (capacitance of the blocking diode BD) according to a capacitance ratio of the CP and CB. Therefore, a divided electric charge of CP·Q/(CP+CB) is stored in the photodiode PD, and a divided electric charge of CB·Q/(CP+CB) is stored in the blocking diode BD.

When the light is irradiated onto the photodiode PD for a charging time ta and it is supposed that a photocurrent generated at this moment is i, an electric charge equal to $\Delta q = i \cdot ta$ is generated. This electric charge is likewise divided into the capacitance CP of the photodiode PD and the capacitance CB of the blocking diode BD. As a result, an electric charge of CB·i/(CB+CP) always flows across the loading resistor R through an external circuit.

As shown in FIG. 10, output waveforms produced at the time the read pulse is applied after the electric charge has been stored is such that compared to a dark output indicated by the solid line (when no light is irradiated) a photoelectric output indicated by the broken line (when light is irradiated) always includes a noise component whose amount is varied depending on the amount of irradiated light.

Let us consider a sensor consisting of a plurality (n) of bits shown in FIG. 8 in which a common electrode is arranged on the photodiode PD side. With a storing time ta, a read pulse duration tr, and a photocurrent i, the total capacitance of the electric charge that is restored into each capacitance CB during the read pulse to one of the bits is as follows.

$$\sum_{i=1}^{n} (n\ tr)(CB \cdot i)/(CP + CB)$$

And the output charge of each bit is as follows.

$$ta\ (CP \cdot i)/(CP+CB)$$

Thus, the detected charge is as follows.

$$ta\ (CP \cdot i)/(CP + CB) + \sum_{i=1}^{n} (n\ tr)(CB \cdot i)/(CP + CB)$$

As a result, the following noise component is present.

$$\sum_{i=1}^{n} (n\ tr)(CB \cdot i)/(CP + CB)$$

For example, if ta=n tr and CP=CB, a noise component equal in amount to the electric charge to be originally detected will be present (if $i_l$ to $i_n$ are equal), thereby causing the problem of inaccurate reading.

To reduce the noise component, it is conceivable that the values can be set so that the relationships ta>n tr and CP>CB are satisfied, but this reduces the reading speed and adds a capacitance in parallel to each photodiode, thus complicating the process (refer to Japanese Patent Unexamined Publication No. 64968/1982).

SUMMARY OF THE INVENTION

The present invention has been made in view of the above circumstances. Accordingly, an object of the invention is to provide an image sensor capable of eliminating the noise component with a simple arrangement and achieving a multiple tone reproduction through an improved S/N ratio.

To achieve the above object, the present invention provides an image sensor which including a first photodiode and a second photodiode, each of which is not light-shielded. These first and second photodiodes are connected in series-opposition to form a light-receiving element. A series of light-receiving elements are arranged in a light-receiving element array so that the first and second photodiodes generate voltages equal to each other when light is irradiated thereonto, thereby leaking no current.

According to the present invention, the two photodiodes are connected in series-opposition so that when light is projected onto diodes, an equal amount of voltage is generated on each diode. As a result, there is no current leakage, generating no noise.

DETAILED DESCRIPTION OF THE PREFERRED EMBODIMENTS

Figure 1:
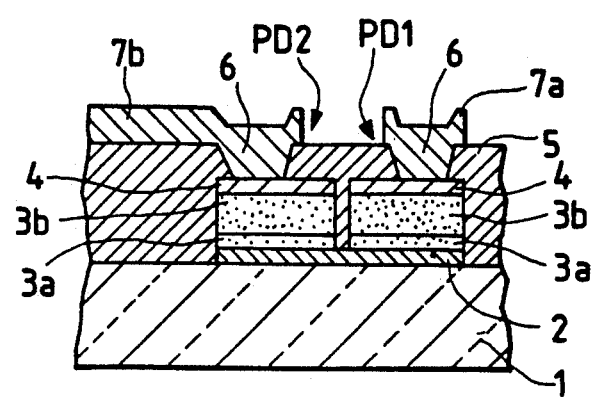
FIG. 1 is a sectional view illustrative of a light-receiving element of an image sensor, which is an embodiment of the present invention.

A light-receiving element portion of an image sensor, which is an embodiment of the present invention, will be described with reference to FIGS. 1 and 2.

Photodiodes PD1 and PD2 are formed by laminating a metal electrode 2 made of, e.g., Cr, an ohmic contact layer 3a which is an n+ layer, a photoconductive layer 3b made of, e.g., a-Si:H, a transparent electrode 4 made of, e.g, ITO, and an insulating layer 5 made of, e.g., polyimide on a transparent substrate 1 made of, e.g., glass. The photodiodes PD1 and PD2 are connected in series-opposition and arranged symmetrically. The transparent electrodes 4 of these photodiodes PD1 and PD2 are connected to lead lines 7a, 7b made of, e.g, Cr through contact holes 6, 6 formed in the insulating layer 5. Since the photodiode PD1 never acts as a forward-biased diode, the ohmic contact layer 3a can be omitted.

Figure 7:
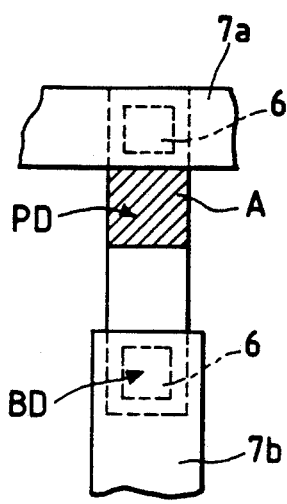
FIG. 7 is a plan view of the light-receiving element shown in FIG. 6.

The upper portions of the photodiodes PD1, PD2 are provided with light-receiving regions A1, A2, respectively (shaded in FIG. 2), adjacent to each other, so that light is irradiated thereonto. These light-receiving regions are designed so that not only each has an equal light-receiving area but also the total of the two light-receiving areas is equal in area to the conventional square-shaped light-receiving region A (FIG. 7) equivalent to a single pixel.

An operation of the image sensor will be described.

Figure 6:
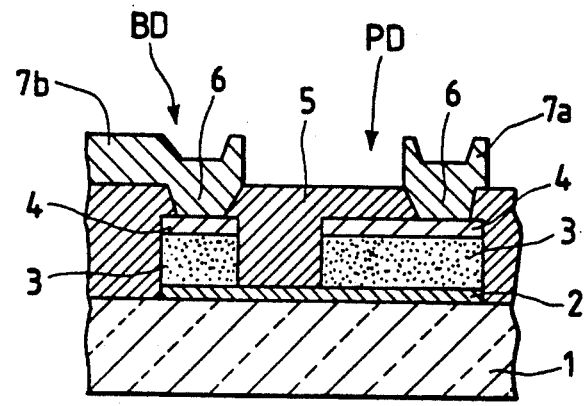
FIG. 6 is a sectional view illustrative of a light-receiving element of a conventional image sensor.
Figure 10:
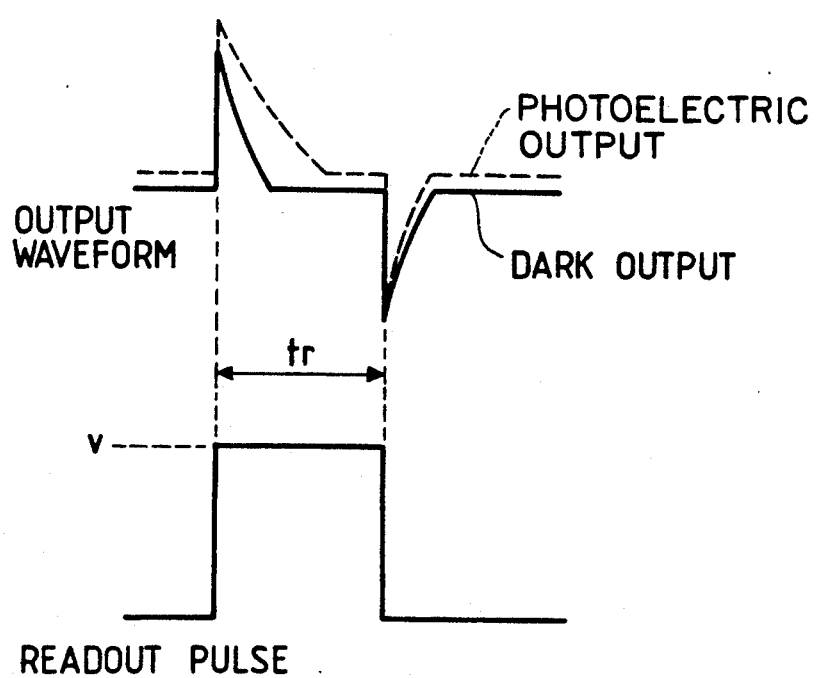
FIG. 10 is a diagram showing output waveforms produced by the light-receiving element shown in FIG. 6.

When a reset voltage V is applied to the photodiode PD2 by a read pulse (a pulse duration of tr) as shown in FIG. 10, an electric charge of Q=CP1 V is stored across the photodiode PD1 that is reversed-biased with respect to the reset voltage V. When the pulse is completed, the electric charge Q (CP1 V) is divided into a capacitive ratio of CP1 to CP2 (CP1=CP2 in the embodiment). The above operation is the same as that of the conventional example shown in FIGS. 6 and 7 except that the electric charge Q is about one half that of the latter (because the light-receiving region of the former is about one half that of the latter).

When light is irradiated onto the photodiodes PD1, PD2 for a period ta, the electric charge generated at the photodiode PD1 is $q_1 = i_1 ta$, the charge generated at the photodiode PD2 is $q_2 = i_2 ta$ (where $i_1$, $i_2$ are photocurrents at a certain illuminance). The sum of the electric charges generated at the photodiodes PD1, PD2 is $(i_1+i_2)ta = \Delta q$, with this $\Delta q$ being redistributed at the capacitive ratio of CP1 to CP2.

Therefore, the photodiode PD1 stores the electric charge:

$$CP1(i_1+i_2)ta/(CP1+CP2) \qquad (1)$$

and the photodiode PD2 stores the electric charge:

$$CP2(i_1+i_2)ta/(CP1+CP2) \qquad (2)$$

By the way, since both photodiodes PD1, PD2 are of the same structure in this embodiment, the generated photocurrent is proportional to the light-receiving region of each photodiode and the capacitance of each photodiode is proportional to the area in which the upper electrode confronts the lower electrode.

Therefore, the following relationship is established.

$$i_1:i_2 = CP1:CP2 \qquad (3)$$

And from equation (3), $$i_1 = (CP1/CP2)i_2 \qquad (4)$$

$$i_2 = (CP2/CP1)i_2 \qquad (5)$$

Substituting equation (5) in equation (1) and equation (4) in equation (2), respectively, Equation $(1) = i_1 ta$ Equation $(2) = i_2 ta$ These values designate the electric charges themselves generated at the photodiodes PD1, PD2. This means that the generated electric charges are not redistributed in this embodiment; i.e., no current is leaked outside and thus no noise is detected.

Figure 3:
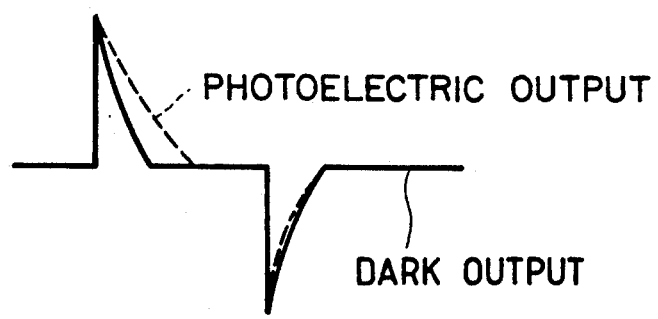
FIG. 3 is a diagram showing an output waveform produced by the light-receiving element shown in FIG. 1.

An output waveform at the time the read pulse is applied after the electric charges have been stored is as shown in FIG. 3. As compared to that shown in FIG. 10, the noise component in the photoelectric output (when light has been irradiated) indicated by the broken line with respect to the dark output indicated by the solid line (when no light has been irradiated) is reduced.

Figure 2:
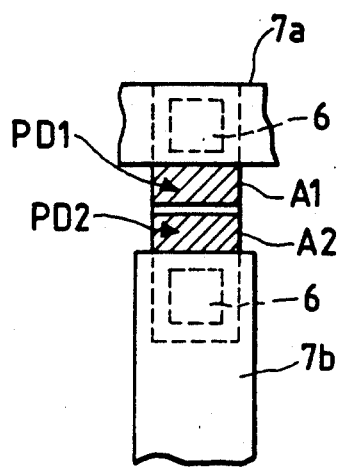
FIG. 2 is a plan view of the light-receiving element shown in FIG. 1.

While the light-receiving region is divided into the upper and lower portions in this embodiment as shown in FIG. 2, the division is not limited thereto but may be any arrangement as long as the divided portions of light-receiving region of the photodiodes PD1, PD2 are equal so that the amounts of the light irradiated per unit area onto the photodiodes PD1, PD2 are equal. For example, the light-receiving region may be divided into right and left portions or in an oblique direction. In addition, the photodiodes PD1, PD2 may be divided into unequal portions as long as the amounts of the light irradiated onto such unequal portions are equal to each other as a whole.

According to this embodiment, two photodiodes are arranged in the area occupied by a single pixel in the conventional arrangement. Therefore, the electromotive forces generated symmetrically at the respective photodiodes PD1, PD2 allow video data equivalent to a single pixel signal to be read without inducing any noise components.

The above is the operation of the light-receiving element in its single bit. The actual operation of the light-receiving element is not exactly as theoretically designed. Thus even if the structure of the two photodiodes PD1, PD2 is the same, the relationship $i_1:i_2=CP1:CP2$ is not satisfied due to differences in the amount of irradiated light which is dependent on their location and influence on their capacitances which is dependent on the line connection. Therefore to satisfy the relationship $i_1:i_2=CP1:CP2$, it is preferable to adjust the ratio of the light receiving areas A1, A2 of the photodiodes PD1, PD2 so as to eliminate current leakage.

There are some cases where a black pixel is located on the photodiode PD1 and a white pixel, on the photodiode PD2 when the light-receiving element is actually used to read an original. In such a case, it is natural that current leaks due to a difference between the amount of light irradiated onto the photodiode PD1 and that onto the photodiode PD2. However, the number of pixels on the light-receiving element is so large that such current can be canceled out by their positive and negative charges in the normal original, making the leaking current so negligible as to cause no practical problem.

Figure 4:
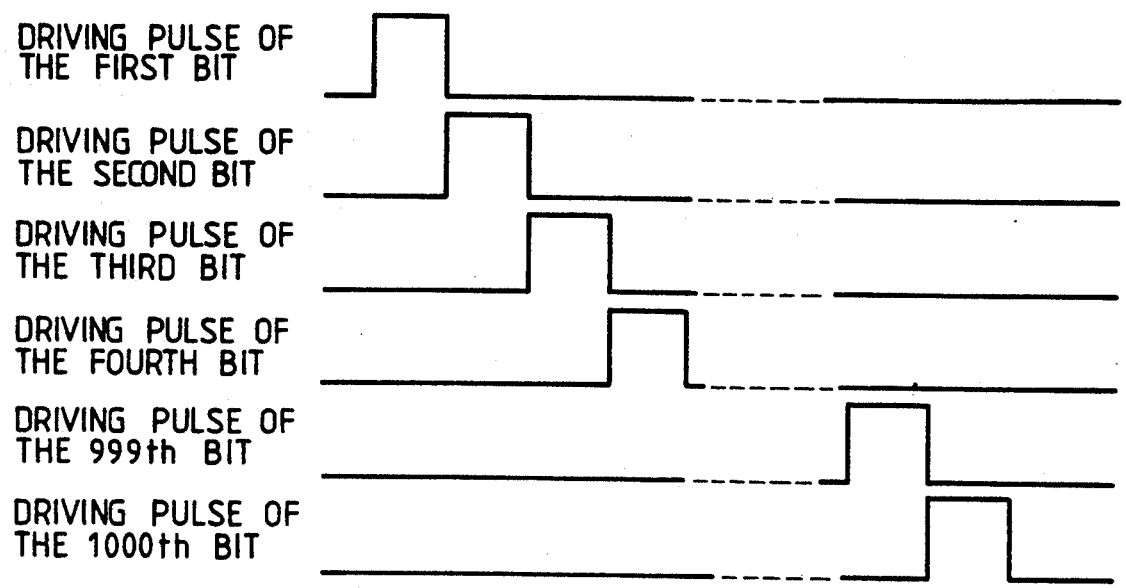
FIG. 4 is a diagram showing waveforms for driving the image sensor shown in FIG. 1.
Figure 5:
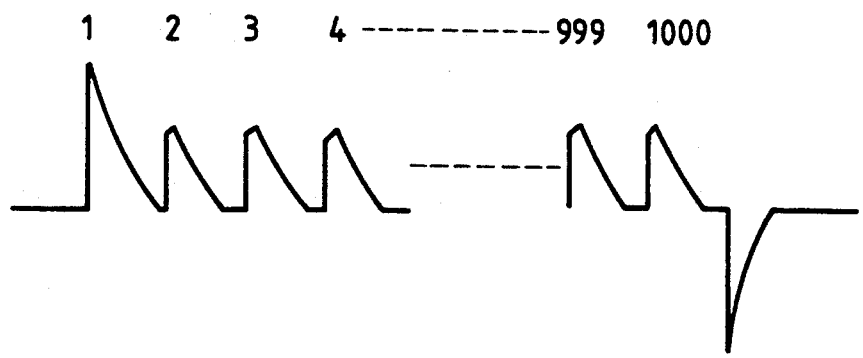
FIG. 5 is a diagram showing output waveforms produced by driving the image sensor shown in FIG. 4.
Figure 8:
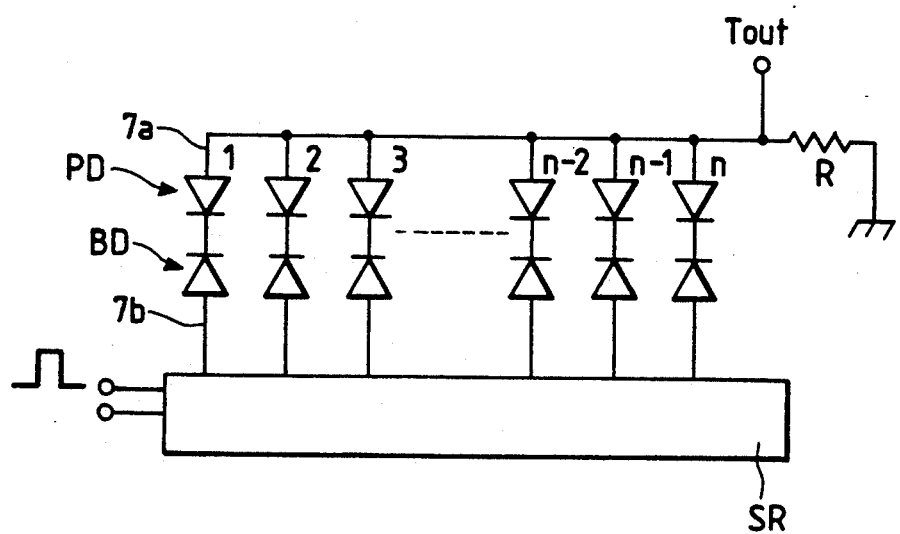
FIG. 8 is an equivalent circuit diagram of the image sensor shown in FIG. 6.
Figure 9:
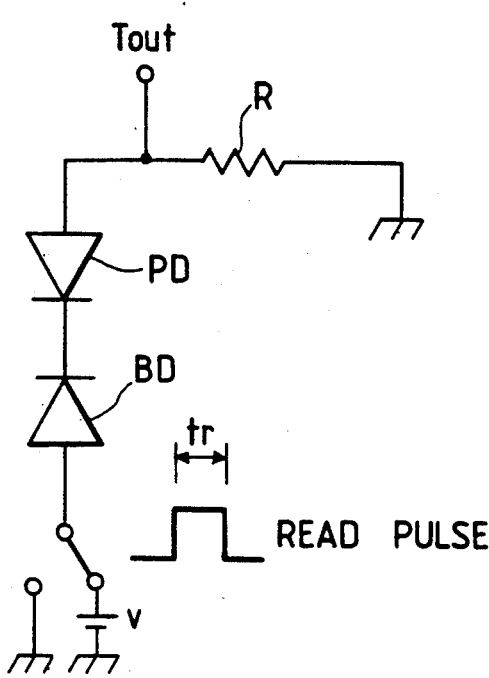
FIG. 9 is an equivalent circuit diagram of a single bit of the light-receiving element.

As described above, to operate a plurality of light-receiving elements, each having a pair of photodiodes PD1, PD2, a line image sensor with a circuit shown in FIG. 8 may be prepared (the photodiode PD corresponds to the photodiode PD1 and the blocking diode BD corresponds to the photodiode PD2 in FIG. 8). Using the line image sensor thus arranged, read pulses applied to the respective light-receiving elements by the shift register SR have their rises and falls coincided with each other as shown in FIG. 4. This serves to cancel switching noises, thereby allowing the correct output to be produced as shown in FIG. 5. However, the switching noise remains uncancelled at the first bit and the last bit (1000th bit). This switching noise can be eliminated by not allowing the data at the first and last bits to be read.

According to the above image sensor, the noise component in the photoelectric output can be reduced as shown by FIGS. 3 and 10, thus the S/N ratio is improved. Therefore, the image sensor of the present invention effectively applicable to color image sensor which require multi-tone data (64 to 256 graduations) reading.

According to the present invention, the two photodiodes are connected in opposition so that the voltages generated thereat when the light is irradiated thereonto are equal to allow no current to be leaked. Therefore, correct outputs can be obtained without inducing noise.

What is claimed is:

1. An image sensor having a plurality of light receiving elements arranged in a line, each light receiving element comprising:

a first photodiode for being irradiated with light and for generating a first photocurrent in response to said light irradiated thereon; and a second photodiode connected to said first photodiode in reverse polarity for being irradiated with light and for generating a second photocurrent in a reverse direction with respect to said first photocurrent, in response to said light irradiated thereon; wherein a first voltage is generated by said first photocurrent, said first voltage being equal to said second voltage; and wherein said first photodiode has a first light receiving area, and said second photodiode has a second light receiving area equal to said first light receiving area.

2. An image sensor as claimed in claim 1, wherein each of said first and second photodiodes comprises:

a transparent substrate;

a metal electrode formed on the substrate;

a photoconductive layer made of a-Si:H (amorphous silicon hydride) formed on the metal electrode;

a transparent electrode formed on the photoconductive layer;

an insulating layer formed on the transparent electrode; and a lead line connected to the transparent electrode through a contact hole formed in the insulating layer.

3. An image sensor as claimed in claim 1, wherein said light receiving elements are sequentially driven by readout pulses, a rising edge of a readout pulse of a light receiving element to be readout next being coincident with a falling edge of a readout pulse of the last light receiving element to have been readout.

4. An image sensor as claimed in claim 3, wherein first and last light receiving elements in the line are inhibited from being readout by a shift register means.

* * * * *

UNITED STATES PATENT AND TRADEMARK OFFICE
CERTIFICATE OF CORRECTION

PATENT NO. : 5,229,858
DATED : July 20, 1993
INVENTOR(S) : Chikaho Ikeda et al.

It is certified that error appears in the above-indentified patent and that said Letters Patent is hereby corrected as shown below:

Abstract, Cover Page, line 5, change "is" to --are--.

Claim 3, column 6, line 52, change "readout" to --read out--.

Claim 3, column 6, line 54, change "readout" to --read out--.

Claim 4, column 6, penultimate line change "readout" to --read out--.

Signed and Sealed this

Thirtieth Day of August, 1994

Attest:

BRUCE LEHMAN

Attesting Officer

Commissioner of Patents and Trademarks